Patented Dec. 29, 1953

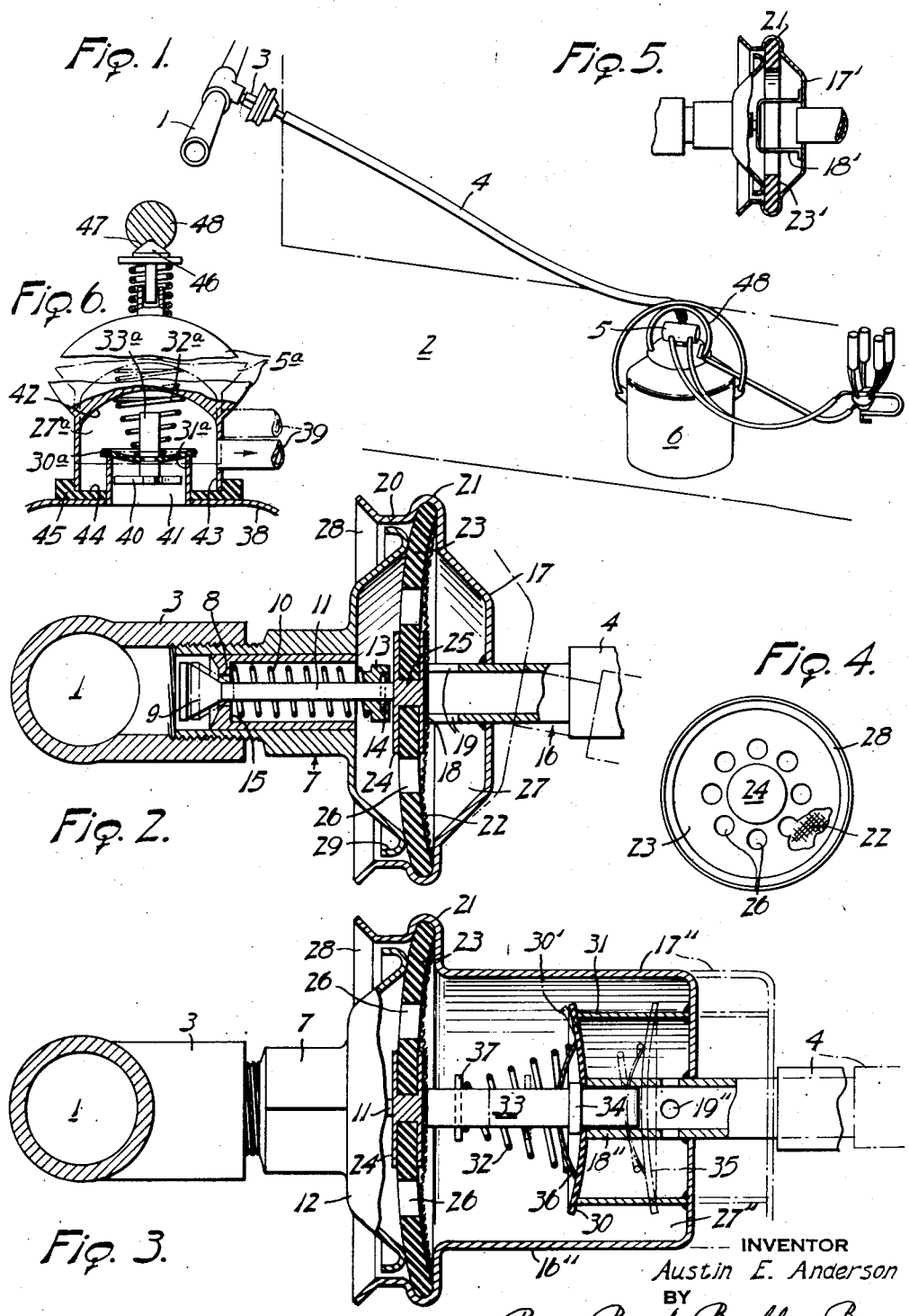

2,664,104

UNITED STATES PATENT OFFICE 2,664,104

VALVED COUPLING FOR MILKING SYSTEM

Austin E. Anderson, Jamestown, N. Y.

Application January 29, 1949, Serial No. 73,494

16 Claims. (Cl. 137—614)

This invention relates to the dairy equipment art and primarily to an improved installation for effecting the milking operations through the instrumentality of suction actuated machines.

In the prior dairy installations it has been customary to connect the milking machine to the suction supply line by a length of hose and then by another operation to turn the valve of the stall for opening the suction to the machine. After the milking of a cow is completed a reverse sequence of operations is resorted to, with likelihood of the hose becoming disconnected from the machine and intaking litter and other clogging foreign matter as the hose falls into the bedding.

The primary object of the present invention is to provide an improved milking apparatus by which the milking apparatus may be readily connected to the suction line and the entire operation greatly facilitated as well as expedited in a practical and time saving manner.

Again, the invention will be found to reside in an installation in which foreign matter will be precluded from entering the pipe system from the milking machine or hose, and, reversely, in which foreign matter and condensation in the pipe system will be precluded from entering the milking machine, all for the purpose of insuring more effective sanitation throughout.

Furthermore, the invention has for its object to provide a simple and durable construction which is efficient in use and capable of giving satisfactory performance.

The foregoing and other objects will manifest themselves as this description progresses wherein reference is made to the accompanying drawing, in which:

Fig. 1 is a general view showing the practical application of my invention;

Fig. 2 is a longitudinal sectional view through a part of the installation depicting more clearly the particular embodiment of the inventive concept;

Fig. 3 is a view similar to Fig. 2 but showing a modified coupler;

Fig. 4 is a plan view, partly in section, of the milking machine coupler;

Fig. 5 is a sectional view of a further modified form of the invention; and

Fig. 6 is a fragmentary sectional view showing a modification of the reverse flow precluding valve.

Referring more particularly to the drawing, the numeral 1 designates the suction manifold or supply pipe which is located above the stalls 2 and extends crosswise of each at the head thereof. At suitable intervals, preferably at alternate stalls, lateral branches or fittings 3 are provided for selective connection by hose 4 to the pulsator mechanism 5 of a milking machine 6.

Ordinarily, a stall cock is equipped with a hand adjusted valve and a nipple over which latter the hose is slipped preliminary to opening the valve. In accordance with the present invention means are provided to facilitate this operation. To this end the stall cock 7, which is attached to the lateral branch 3 is closed automatically by a valve 9 engaging an internal seat 8 under the urge of a coiled spring 10. The valve stem 11 extends through a valve seat 8 and into a bell or cup 12 where a retaining ring 13 is secured thereon by a cotter pin 14 to support the spring under compression against an internal shoulder 15 on the under side of the valve seat. The valve 9 may be, as illustrated, in the form of a tapered head and engages its seat close to the stem where its diameter is small. Consequently, the surface area on which the suction or pressure differential will act is small and therefore the spring 10 need exert only a little force to counteract the pressure differential in seating the valve normally against air leakage into the suction line 1.

Cooperating with the stall cock is a coupler 16 likewise provided with a bell 17 into which a hose attaching nipple 18 extends having transverse slots 19 for constant communication with the interior of the cup or bell 17. This bell has a cylindrical wall 20 for receiving the bell 12 and is formed with an annular groove 21 into which a filter sheet 22 is secured, as by means of a supporting disk 23 designed for being sprung into the annular seat thus provided. This formation may be conveniently given through a spinning or other operation. The supporting disk 23 is preferably rubber, or like resilient material, and at its center is reinforced by flanking metal disks 24 joined by a stem 25. About this central reinforcement the rubber disk or body is provided with an annular series of openings 26 which the filter sheet overlies. The stiffness of the rubber disk is sufficient to accord the same a generally convex shape with the reinforced center resting upon the projecting inner end of the nipple 18. Thus disposed the disk will engage the valve stem 11 and unseat the valve when the complemental bells 12 and 17 are fitted together. The flow of air will then be from the pulsator 5 through the hose 4 into the bell 17 through the filter sheet and apertures 26 into the bell 12 and on through the valve seat opening into the suction line 1. Any foreign matter picked up by the air stream passing through the hose 4 will be lodged in the chamber 27 of bell 17 as it is filtered out by the sheet 22. Likewise, any milk which may be drawn into the tube will also be retained in this chamber against passage into the system.

To facilitate the placement of the stall cock coupler 16 against the stall cock 7, the cylindrical wall 20 is formed with a guiding flange 28 of flaring contour which will serve to guide the beaded periphery 29 of the bell 12 thereinto, and immediately upon the valve 9 becoming unseated the pressure differential acting on the bell 17 will urge the marginal portion of the rubber disk 23 into resilient contact with the marginal portion 29 of the bell 12 to firmly seat and seal the coupled parts against air leakage. The rubber disk will therefore have an airtight engagement with both bells and by reason of the pressure differential the cooperating parts will be firmly held in this airtight relation as long as the milking operation continues. Upon completion of the milking operation a quick whip or movement of the hose 4 laterally, such as to a position indicated by the broken lines 4a in Fig. 2, will break the airtight seal and tilt the bell 17 upon the fixed bell 12 whereupon the spring 10 will act against the suction line pressure to seat the valve 9 and thereby close the stall cock 7 against free entrance of air into the system.

The milking installation is practical in that the mere placement of the bells one upon the other will automatically establish a communication between the milking machine and the low pressure of the system. The proper axial alignment of the two bells will be facilitated by guidance of the flange 28 and thereafter the coupling action will be automatically accomplished without effort on the part of the attendant. The unseating of the valve 9 will be effected by a cushioned action through the resilient suspension of the disk 23, and after the suction line communication has been established the rubber disk will assume a slightly dished contour by reason of the pull exerted by the hose 4 on the sealing contact with the rolled edge 29 of the bell 12. The resilient disk may readily be replaced for renewing the filter sheet and for cleaning the chamber 27 as occasionally required.

In lieu of the rubber or resilient support 23 a rigid member 18' may be provided, this being shown as a U-shaped member spot welded to the bell 17', with an annular resilient member 23' fitting in the seat 21.

Another important feature of the present invention is the provision of means for precluding the passage of germs from the suction line or stall cock to the milking machine. It sometimes develops that there is moisture of condensation in the pipeline which tends to work itself back into the milking machine and thereby contaminate the milk content. To this end there is provided in the suction line between the machine 6 and the stall cock a valve 30 of large peripheral expanse having marginal sealing contact with an annular seat 31 under the pressure of a spring 32. The valve is slidably carried by a stem 33 beneath a shoulder 34 and normally assumes a convex shape substantially as shown by the broken lines 35 in Fig. 3. The spring seats upon a pressure distributing plate 36 and normally urges the stem 33 in resilient support against the resilient disk 23 so as to give support to the central valve unseating portion 24. The opposite end of the stem 33 is telescopically guided within the nipple 18", having radial communicating passages 19", and when in its operative position the stem 33 will be depressed by the disk 23 to cause the shoulder 34 to move the valve 30 in supporting contact with the adjacent free end of the nipple. This will cause the valve 30, which is in the nature of a flexible rubber disk, to take on a concave shape, as shown by the full lines in Fig. 3, thereby increasing the resilient urge upon the valve which holds the marginal portion thereof in valving contact with the underlying rim 31. The valve 30, being in the nature of a thin flexible rubber disk, will have its flexible margin free to yield readily at one portion or another to permit the flow of air from the milking machine, as indicated at 30'.

By reason of this resilient valve, the marginal portion thereof will be free to lift from the rim or seat to permit airflow toward the suction line, but will quickly close to any reverse flow toward the milk container. An anchor pin 37 provides support for the spring on the stem 33, and when the stem is in its operative position, as shown, solid support will be provided for the valve unseating central portion 24 of the resilient disk 23.

If desired, the valve 30 may be located at any suitable place between the source of suction (not shown) and the milking machine. Preferably a chamber 27" encircles the rim or seat 31 to trap any foreign matter or liquid which may seek to pass beneath the valve 30. In the illustrated embodiment this chamber 27" together with the reverse flow precluding valve 30 is incorporated in the stall cock coupler 16", the bell 17" being given a cylindrical or cup shape to fully house and enclose the valve.

In Fig. 6 the reverse flow preventing valve 30a is interposed between the pulsator 5a and the cover 38 of the milk receiver 6. This valve engages the annular seat 31a through which air flows into the chamber 27a. The hose is connected to a nipple 39 leading from this chamber. The valve has the lower end of its stem 33a provided with a guiding spider 40 fitting into the air passage 41 through the valve seat 31a. Interposed between the top wall 42 of the chamber 27a is a coil spring 32a which is compressed by and upon placement of the pulsator upon the cover 38. Like in the embodiment depicted in Fig. 3, the spring 32a is conditioned by and upon assemblage of the parts 5a and 38. Removal of one part, such as the pulsator, frees the spring of any distortion and enables ready removal of the valve for thorough cleansing of the milking machine parts. The parts 5a and 38 therefore constitute separable parts of a coupling in the suction line. The bottom edge of the wall 43, which defines the chamber 27a, seats within a depression 44 in a rubber gasket 45 fitted about the upstanding seat 31a, and upon placement of the pulsator in its operative position, a spring detent 46 carried by the pulsator is designed to engage in a recess 47 in the under side of a bail or handle 48 fixed to the cover 38. The detent is readily snapped into the recess 47 to lock the pulsator in its operative position. The tension or compression on the spring 32a, as well as on the spring 32 in Fig. 3, may be predetermined and may be sufficient to cause the rubber valve disk to assume a dished shape. It is sufficient, however, to yieldably hold the valve to its seat in a manner to quickly close against reverse passage of any foreign matter into the air passage 41 whenever the suction communication is interrupted. The valve disk 30a (30) by assuming a slightly dished contour under the urge of the spring will cause the marginal portion of the valve disk to firmly engage the inner annular edge of the valve seat for effecting a fluid tight seal against reverse flow.

A stall cock constructed in accordance with the present invention is readily coupled and uncoupled expeditiously without the necessity of reaching for a manual valve to open the fluid communication. The stall cock is automatically closed whenever the milking machine is uncoupled therefrom. Ample filter surface is provided to insure efficient operation, and special provision is made to eliminate the possibility of milk contamination through the passage of germs from the suction line to the milking machine.

The construction is simple and economical in production, and while the foregoing description has been given in detail it is not intended thereby to limit the invention since the inventive principles involved are capable of assuming other physical embodiments without departing from the spirit of the invention and the scope of the appended claims.

What is claimed is:

1. A stall cock coupling for milking machine installations, comprising a stall cock opening through a bell, a spring seated valve normally closing the stall cock, a hose coupler also opening through a bell and cooperable with the stall cock bell for connecting a milking machine to a pressure line, the two bells fitting airtight at their marginal portions, and a spring closed valve on the coupler serving to preclude fluid flow thereinto from the stall cock, said stall cock having a part operable to increase the spring force for the latter valve by and during placement of the coupler on the stall cock to condition such valve for operation.

2. A stall cock coupling for milking machine installations, comprising a stall cock opening through a bell, a spring seated valve normally closing the stall cock, a hose coupler also opening through a bell and cooperable with the stall cock bell for connecting a milking machine to a pressure line, the two bells fitting airtight at their marginal portions, and a spring closed valve on the coupler serving to preclude fluid flow thereinto from the stall cock, said stall cock having a part operable to increase the spring force for the latter valve by and during placement of the coupler on the stall cock to condition such valve for operation, said second valve being in the form of a flexible disk seating at its margin on a narrow seat with its margin free to resiliently yield in part from the seat.

3. A stall cock coupling for milking machine installations, comprising a stall cock opening through a bell, a spring seated valve normally closing the stall cock, a hose coupler also opening through a bell and cooperable with the stall cock bell for connecting a milking machine to a pressure line, the two bells fitting airtight at their marginal portions, said coupler having a hose nipple extending into the bell within an annular seat, which latter is raised to provide an encircling trap chamber, a flexible valve disk having its margin engaging the seat to preclude reverse fluid flow through the coupler, and resilient means yieldably holding the disk on its seat, the stall cock having a part engageable with said resilient means by and upon bringing the bells together for increasing the resilient force to condition the resilient means for so functioning.

4. A stall cock coupler member having a hose line to a milking machine and including a valve precluding reverse fluid flow therethrough, said valve being in the form of a flexible disk having its margin engaging a seat, and resilient means pressing the disk to its seat, said resilient means engageable by a part on the stall cock for increasing the resilient force upon placement of the coupler thereon.

5. Milking machine apparatus comprising a suction line including a coupling composed of separable parts, one part having a valve engaging a seat to close the opening therethrough, spring means for urging the valve to its seat and yieldable to enable fluid flow through the coupling in one direction, and means carried by the companion coupling part to increase the spring force to a predetermined extent by and during assemblage of the coupling parts for conditioning and rendering the spring means operative.

6. A stall cock coupling member for connection to a stall cock having a normally closed valve comprising a bell-like coupler having a chamber and a substantially axial support provided with a fluid flow passage opening into the chamber, the inner side wall of the bell having a circumferentially extending seat, a resilient perforated disk spring into interlocking supporting engagement with the seat and having its central part acting when coupled to a stall cock to hold its valve opened, a valve normally closing the fluid flow passage, and spring means yieldably holding the passage valve so closed, said spring means being interposed between and supported by the disk and the axial support and serving to give support to the central part of the perforated disk.

7. A stall cock coupling member for connection to a stall cock having a normally closed valve comprising a bell-like coupler having a chamber and a substantially axial support provided with a fluid flow passage opening into the chamber, the inner side wall of the bell having a circumferentially extending seat, a resilient perforated disk spring into interlocking supporting engagement with the seat and having a central part engageable with a stall cock valve to open it when the coupler is engaged with a stall cock, a valve seat encircling the axial support, a flexible valving disk engaging the seat, a stem slidably engaging the support and having supporting contact with the central part of the perforated disk for being held in place by the latter, and a spring urging the stem against the perforated disk to provide yielding support for the central part thereof.

8. A stall cock coupling member for connection to a stall cock having a normally closed valve comprising a bell-like coupler having a chamber and a substantially axial support provided with a fluid flow passage opening into the chamber, the inner side wall of the bell having a circumferentially extending seat, a resilient perforated disk sprung into interlocking supporting engagement with the seat and having its central part acting when coupled to a stall cock to hold its valve opened, a valve normally closing the fluid flow passage, and spring means yieldably holding the passage valve so closed, said spring means being interposed between and supportd by the disk and the axial support and serving to give support to the central part of the perforated disk, said spring means including a stem having limited axial movement on the support for providing solid support for the central part of the perforated disk after a predetermined yielding movement of the central part.

9. A milking machine suction line valve comprising a body having a chamber with an axially arranged flow passage opening through an annular seat, a resilient valving disk closing on the seat to close the passage, said disk having an axially upstanding stem, and a cooperating member having a suction passage and removably engaged with the body to close the chamber, said cooperating member when engaged with the body depressing the central portion of the disk into the annular seat to urge the peripheral margin of the disk more firmly upon the seat.

10. In a milking machine installation having a suction line leading from a stall cock, a reverse flow preventing valve interposed in the line of suction communication, said valve including a body with a raised annular seat, a flexible disk of rubber or the like having its margin engaging upon the annular seat, said body having a removable section opposite the annular seat, and means interposed between the disk and the section and acting upon placement of the latter to depress the central portion of the valve disk to cause the latter to assume a dished contour whereby to press the marginal portion upon the seat.

11. In a milking machine installation having a suction line leading from a stall cock, a body having separable sections defining a chamber, one section having an upstanding annular seat, a reverse flow preventing valve arranged in the chamber, said valve being in the form of a flexible disk of rubber or the like having its margin engaging the annular seat, and a stem upstanding from the central portion of the disk and held depressed by the other section to dish the disk within the annular seat.

12. A milking machine suction line valve comprising a body having a chamber with an axially arranged flow passage opening through an annular seat, a resilient valving disk closing on the seat to close the passage, a guiding stem for the disk, a spring normally acting to lightly urge the valving disk to its seat but yielding to a predetermined pressure differential, and a cooperating suction supply member removably engaged with the body and acting when so engaged to increase the spring force to hold the valve seated against a greater pressure differential.

13. A stall cock coupling for milking machine installations, comprising a stall cock opening through a bell, a spring seated valve normally closing the stall cock, a hose coupler also opening through a bell and cooperable with the stall cock bell for connecting a milking machine to a pressure line, the two bells fitting airtight at their marginal portions, said coupler having a hose nipple extending into the bell within an annular seat which latter is raised to provide an encircling trap chamber, a flexible valve disk having its margin engaging the seat to preclude reverse fluid flow through the coupler, and resilient means yieldably holding the disk on its seat.

14. In a milking machine installation having a suction line leading from a stall cock, a reverse flow preventing valve interposed in the line of suction communication, said valve including a body with a raised annular seat, a flexible disk of rubber or the like having its margin engaging upon the annular seat, a stem slidable through the disk and fitting the seat to position the disk thereon, the stem portion which extends from the opposite side of the disk supporting a coiled spring which reacts upon the disk to hold it seated.

15. In a milking machine installation having a suction line leading from a stall cock, a reverse flow preventing valve interposed in the line of suction communication, said valve including a body with a raised annular seat, a flexible disk of rubber or the like having its margin engaging upon the annular seat, a stem slidable through the disk and fitting the seat to position the disk thereon, the stem portion which extends from the opposite side of the disk supporting a coiled spring which reacts upon the disk to hold it seated, said body having a cock-attaching bell upstanding about the seat in outwardly spaced relation thereto, and a perforated disk carried by the bell outwardly of the seat and serving to hold the stem in position.

16. In a milking machine installation having a suction line leading from a stall cock, a reverse flow preventing valve interposed in the line of suction communication, said valve including a body with a raised annular seat, a flexible disk of rubber or the like having its margin engaging upon the annular seat, a stem slidable through the disk and fitting the seat to position the disk thereon, the stem portion which extends from the opposite side of the disk supporting a coiled spring which reacts upon the disk to hold it seated, a convex pressure distributing plate being interposed between the disk valve and the spring, the spring being supported on the convex side of the plate to cause the latter to apply the spring pressure adjacent the margin of the valve disk.

AUSTIN E. ANDERSON.

References Cited in the file of this patent

UNITED STATES PATENTS

| Number | Name | Date |
| --- | --- | --- |
| 372,947 | Harlingen, Sr., et al. | Nov. 8, 1887 |
| 1,130,679 | Staunton | Mar. 2, 1915 |
| 1,178,978 | Wainwright | Apr. 11, 1916 |
| 1,188,969 | Meister | June 27, 1916 |
| 1,522,369 | Jaden | Jan. 6, 1925 |
| 2,174,503 | Whipple | Sept. 26, 1939 |
| 2,288,565 | Green | June 30, 1942 |
| 2,367,188 | Anderson | Jan. 16, 1945 |
| 2,451,456 | Rawson | Oct. 12, 1948 |